(12) United States Patent
Eide et al.

(10) Patent No.: US 9,542,478 B2
(45) Date of Patent: Jan. 10, 2017

(54) VIEWING HIERARCHICAL DATA USING A GRID FORMAT

(71) Applicant: Oracle International Corporation, Redwood Shores, CA (US)

(72) Inventors: Michael Donald Eide, Lafayette, CO (US); David Wayne Nowakowski, Thornton, CO (US); Jonathan Stirling, Lone Tree, CO (US); Scott Gene Buss, Centennial, CO (US); John David Bilthuis, Highlands Ranch, CO (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 345 days.

(21) Appl. No.: 14/247,790

(22) Filed: Apr. 8, 2014

(65) Prior Publication Data

US 2014/0304282 A1 Oct. 9, 2014

Related U.S. Application Data

(60) Provisional application No. 61/809,859, filed on Apr. 8, 2013.

(51) Int. Cl.
*G06F 17/30* (2006.01)
*H02G 3/04* (2006.01)

(52) U.S. Cl.
CPC ... *G06F 17/30699* (2013.01); *G06F 17/30589* (2013.01); *H02G 3/0487* (2013.01)

(58) Field of Classification Search
None
See application file for complete search history.

(56) References Cited

U.S. PATENT DOCUMENTS

| | | | | |
|---|---|---|---|---|
| 8,296,326 B1 * | 10/2012 | Ivaciov | G06F 17/30589 | 707/797 |
| 8,301,419 B1 * | 10/2012 | Suhr | G06F 17/50 | 700/98 |
| 2004/0230676 A1 * | 11/2004 | Spivack | G06F 17/30908 | 709/223 |
| 2007/0226187 A1 * | 9/2007 | Beatty | G06F 17/30587 | |
| 2009/0063547 A1 * | 3/2009 | Wright | G06F 17/30274 | |
| 2009/0313268 A1 * | 12/2009 | Folting | G06F 17/30418 | |
| 2011/0106834 A1 * | 5/2011 | Blackwell | G06F 17/30873 | 707/769 |
| 2011/0191303 A1 * | 8/2011 | Kaufman | G06F 17/30286 | 707/684 |
| 2013/0104088 A1 * | 4/2013 | Santos-Gomez | G06F 17/30994 | 715/854 |

* cited by examiner

*Primary Examiner* — Richard Bowen
(74) *Attorney, Agent, or Firm* — Vista IP Law Group, LLP (57) ABSTRACT

Disclosed are methods and apparatuses for viewing hierarchical data. One disclosed approach provides a method and system for viewing and navigating through hierarchical data while maintaining a hierarchical context that allows for the user to traverse up and down the hierarchy.

30 Claims, 10 Drawing Sheets

VIEWING HIERARCHICAL DATA USING A GRID FORMAT

CROSS-REFERENCE TO RELATED APPLICATIONS

The present application claims the benefit of priority to U.S. Provisional Application No. 61/809,859, entitled "VIEWING HIERARCHICAL DATA USING A GRID FORMAT", filed on Apr. 8, 2013, which is hereby incorporated by reference in its entirety.

BACKGROUND

In many data systems, data records are displayed to users using a grid or other type of flat data structure. A grid has the advantage of being able to display large numbers of records at once. Records in a grid may be sorted by column (e.g., name, ID number, amount) to allow for easier analysis of the data.

However, there are a number of disadvantages to displaying data in a grid that occur when the data is hierarchical in form. Hierarchal data may comprise any data with parent/child relationships, such as a list of accounts having a parent/child structure. When displaying large volumes of hierarchical data in a grid, it can be difficult for a user to analyze and make use of the displayed data. Traditionally this can be mitigated by allowing the data to be filtered, reducing the amount of data displayed and isolating levels in the hierarchy that the user wishes to view. Unfortunately, this also obscures any hierarchical relationship between the levels. This problem is further exacerbated by large record sets, as it becomes difficult to view portions of any given level in the hierarchy at one time or to isolate child records of particular parent records.

Therefore, there is a need for a system for displaying hierarchical data that allows users to traverse the levels of the hierarch while maintaining the relationships between levels.

SUMMARY

The present invention presents methods, systems, and computer program products for viewing and navigating through hierarchical data while maintaining relationships between levels of the hierarchy.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION

Various embodiments are described hereinafter with reference to the figures. It should be noted that the figures are not drawn to scale and that the elements of similar structures or functions are represented by like reference numerals throughout the figures. It should be noted that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

Some embodiments of the invention address the above problems by providing an interface that allows user to navigate through levels of a hierarchy while maintaining a hierarchical context to track the user within the hierarchy, in order to preserve referential ability and maintain relationships between levels.

Figure 1:
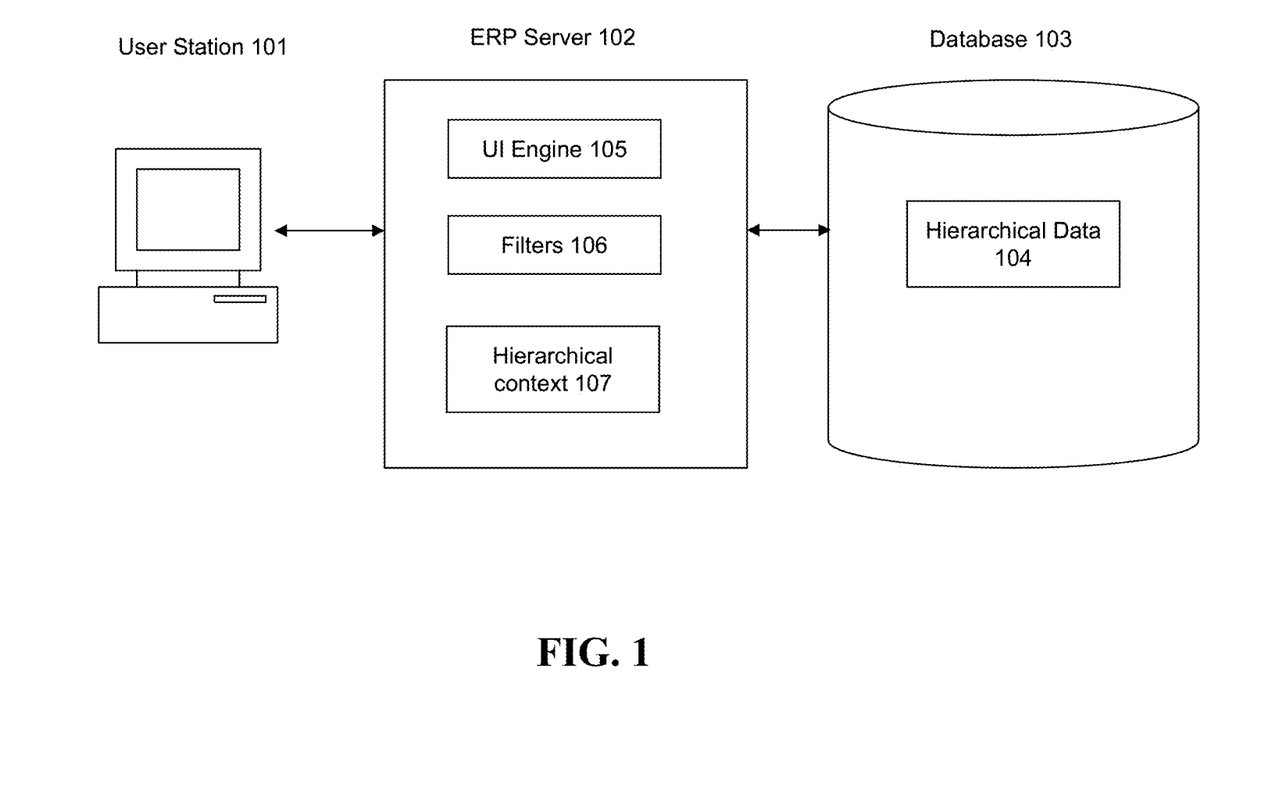
FIG. 1 illustrates an architecture of a system in accordance with embodiments of the invention.

FIG. 1 illustrates an architecture of a system in accordance with embodiments of the invention. The users operate the system at user station 101 to access and utilize applications on server 102. Server 102 is configured to access data on database 103, which includes hierarchical data 104.

Server 102 includes a user interface (UI) engine 105 configured to display a graphical user interface (GUI) at user station 101. The user may use the GUI provided by the UI engine to specify the data that is desired to be viewed and traverse the different hierarchical levels of the hierarchical data 104.

In order to view different levels of the hierarchical data 104, the server includes a plurality of filters 106. The user may use the UI engine 105 to specify the filters to be used. In addition, server 102 maintains a hierarchical context 107 for the data that is being viewed by the user, so that the relationships between levels are maintained. The hierarchical context 107 comprises data pertaining to the hierarchy for the data being viewed, which may include information on child data or data from one or more parent records. In some embodiments, the hierarchical context 107 may track the user's navigation through the hierarchy and so that the user may drill down through levels of the hierarchy and use the hierarchical context to return to previous levels.

The user at the user station 101 operates the system to view and manipulate the hierarchical data. The user station 101 comprises any type of computing station that may be used to operate or interface with the application server. Examples of such user stations include for example, workstations, personal computers, laptop computers, or remote computing terminals. The user station 101 comprises a display device, such as a display monitor or screen, for displaying interface elements and report data to the user. The user station 101 may also comprise one or more input devices for the user to provide operational control over the activities of the system, such as a mouse, touch screen, keypad, or keyboard. The users of the user station 101 correspond to any individual, organization, or other entity that uses system to access applications on application server 102.

The database 103 corresponds to any type of computer readable mediums or storage devices. The computer readable storage devices comprise any combination of hardware and software that allows for ready access to the data within the database. For example, the computer readable storage device could be implemented as computer memory or disk drives operatively managed by an operating system.

Figure 2:
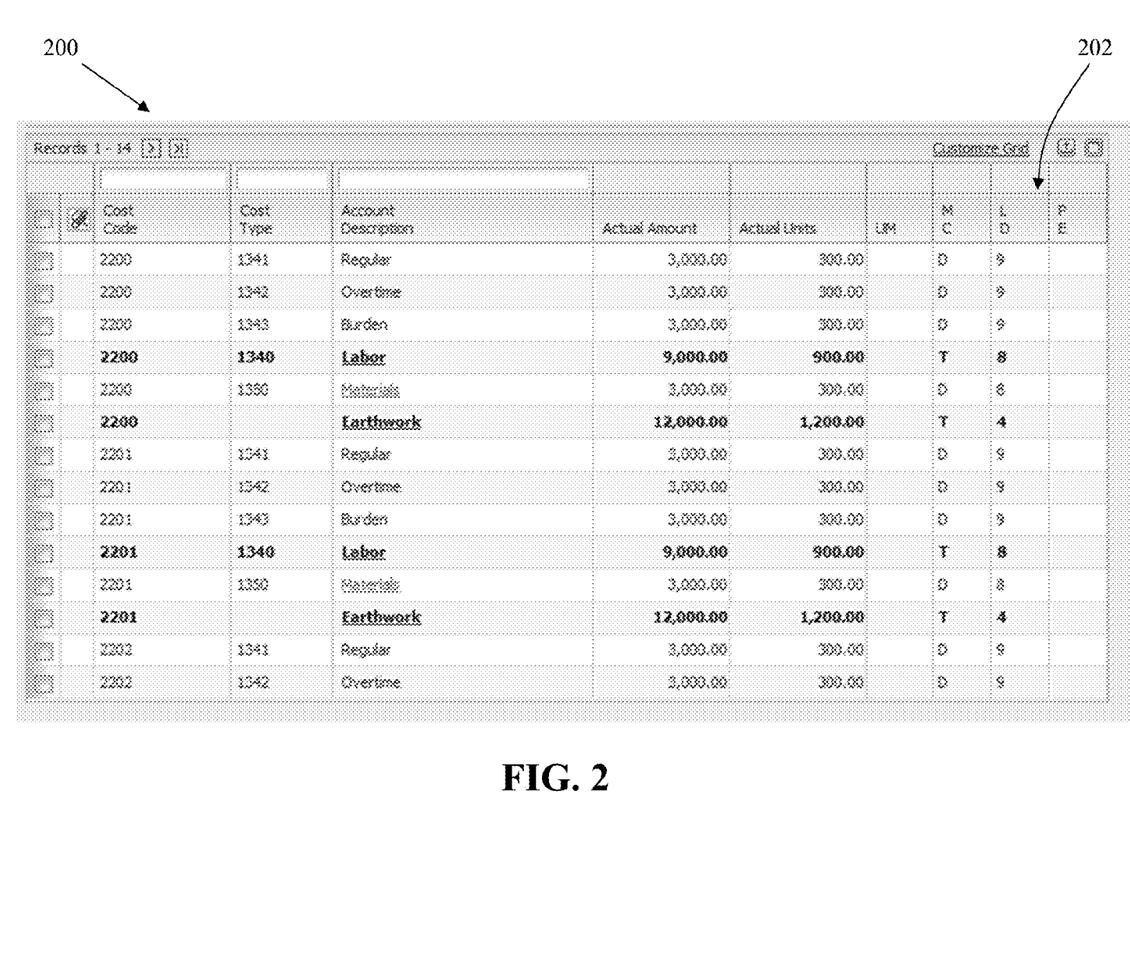
FIG. 2 illustrates an example screenshot of an application displaying hierarchical data in a grid format.

FIG. 2 illustrates an example screenshot of an application user interface 200 displaying hierarchical data using a grid. The level of detail column (LD) 202 represents the hierarchical relationship between the records in the grid. In the illustrated example, data records with an LD of 9 are in the lowest hierarchical level, and are child records to data records with an LD of 8. Data records with an LD of 8 are in turn child records of data records having an LD of 4.

Using filtering techniques, one can isolate a particular level of detail, but then any reference to parent and child records is lost. For example, a filter can be specified to only display data records with an LD of 8, which will result in displaying the mid-level hierarchical data. However, doing so causes the parent-child relationships of the data records to be lost. All data records with an LD of 8 will be displayed in the grid, but there will not be a way to tell which of those records come from which parent records. In systems having large volumes of data records, each LD may have hundreds or even thousands of data records, making it difficult for users to isolate the data that they are looking for (e.g., records with an LD of 8 that are the child of a particular parent record).

One solution to this problem is having a UI construct that provides an intuitive paradigm that supports navigating through "n" levels of hierarchy while maintaining the relationships between levels.

When a record in the grid has lower level children, a visual, clickable indicator is provided, which allows the user to drill down to the next level of the hierarchy. When this navigation occurs, the hierarchical context may be instantiated. In some embodiments, as additional levels are traversed, each level is added as an element of the hierarchical context. These elements provide both a representation of the relationships and a quick navigation between levels by selecting an element.

Figure 3:
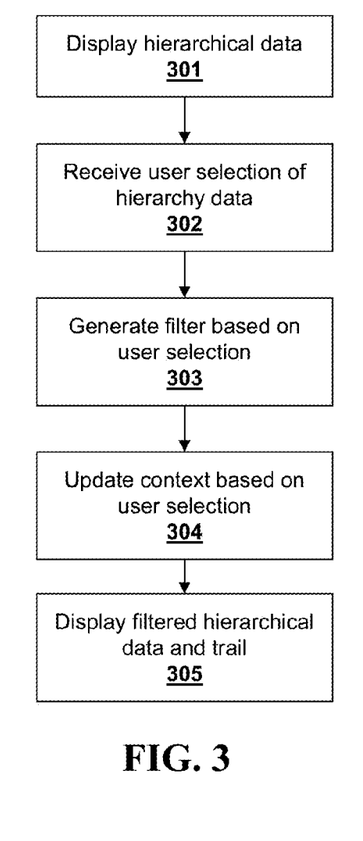
FIG. 3 illustrates a flowchart for a method of displaying hierarchical data in a grid that preserves the relationships between hierarchical levels, in accordance with certain embodiments of the invention.

FIG. 3 illustrates a flowchart for a process for displaying hierarchical data as a grid in a way that allows for users to navigate through levels of the hierarchy while preserving the relationship between levels. First, at 301, hierarchical data is displayed to the user. This may be in a grid similar to the grid shown in FIG. 2.

At 302, a user may make selections for navigating through the levels of the hierarchy. In some embodiments, this may be done by providing a clickable indicator for data records having lower level children, such as by creating a button next to the data record or making the row or portions of the row in which the data record is displayed clickable. For example, the hierarchical data may contain a data record named "Project A" having a number of lower level child records. A user may wish to view the child records of Project A, and so will select the Project A data record by clicking on the button or on the row.

At 303, the system generates a filter based on the user selection. For example, if the user at 302 selected the "Project A" data record, a filter will be created for lower level child records of Project A. In some embodiments, the filter may filter by LD and by selected record, so that only child data records that are the next level of the hierarchy down from the selected record are returned. In other embodiments, the filter may be configured to only filter by selected record, and thus returning all child records of the selected record, regardless of the number of hierarchy levels between them.

At 304, the system updates a hierarchical context based on the user selection. The hierarchical context may be based upon the data records that the user is viewing. In some embodiments, as levels of the hierarchy are traversed, they are added to the hierarchical context. For example, when the user selects the "Project A" data record, "Project A" may be added to the hierarchical context. As the user selects additional data records to traverse deeper into the hierarchy, the selected data records for each level are added to the hierarchical context.

At 305, the filter is applied to the hierarchical data, and the resulting data is displayed to the user. In addition, the hierarchical context may also be displayed so that the relationship between the levels of the hierarchy is maintained. In some embodiments, the hierarchical context may show the higher levels of the hierarchy, which the user may select to return to those levels. For example, the user may wish to return to the hierarchy level of Project A. To do so, the user may click on Project A in the hierarchical context to return to the hierarchy level of the Project A data record. The user may also travel deeper to lower levels of the hierarchy by selecting a data record of the filtered hierarchy data that has lower level child records.

The invention is implemented according to some embodiments by creating a grid-crumb structure that is populated as the user navigates through the different levels of the hierarchy. The grid-crumb structure provides a textual representation and/or description of the hierarchical context at each hierarchical location within the data to be navigated by the user. As the user selects a given portion of the hierarchy to drill down into, a new grid-crumb structure is created for that level of the hierarchy. This means that a user that drills down through multiple levels of the hierarchy will cause a set of grid-crumb structures to be created that correspond to the different levels of the navigated hierarchy.

Figure 4:
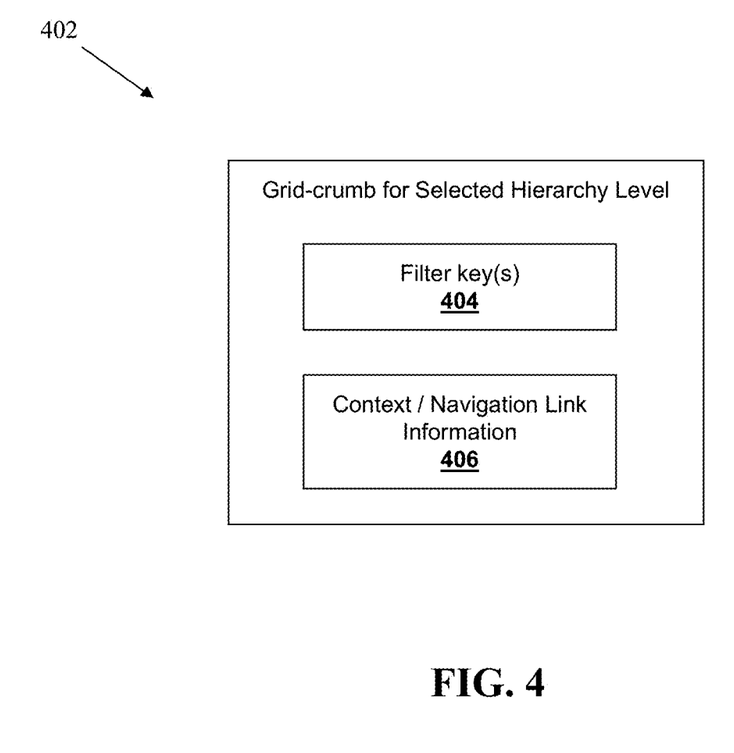
FIG. 4 provides a representation of a grid-crumb structure according to some embodiments of the invention.

FIG. 4 provides an illustrative representation of a grid-crumb structure 402 according to some embodiments of the invention. Grid-crumb structure 402 comprises a container which includes a representation of filter key(s) 404. The keys 404 are used to filter the overall set of hierarchical data such that only the data corresponding to the selected level of the hierarchy can be identified and then displayed. Any suitable set of keys can be maintained to provide the filtering functionality. For example, for a project-based set of hierarchical data as shown in FIG. 2, the filter keys can be implemented as the combination of values from the cost code, cost type, and/or LD (level of detail) columns. A filter can be created from these keys to identify the exact set of data that should be displayed for a selected hierarchical level of the data.

The grid-crumb structure 404 may also include navigation link information 406. The navigation link information 406 provides enough hierarchical context to preserve the relationship between the current level of the hierarchy to its parent level(s) of the hierarchy. The navigation link information 406 may be maintained as a link or a set of links to the parent levels of the hierarchy, which can then be selected by the user to return to those levels.

Figure 5:
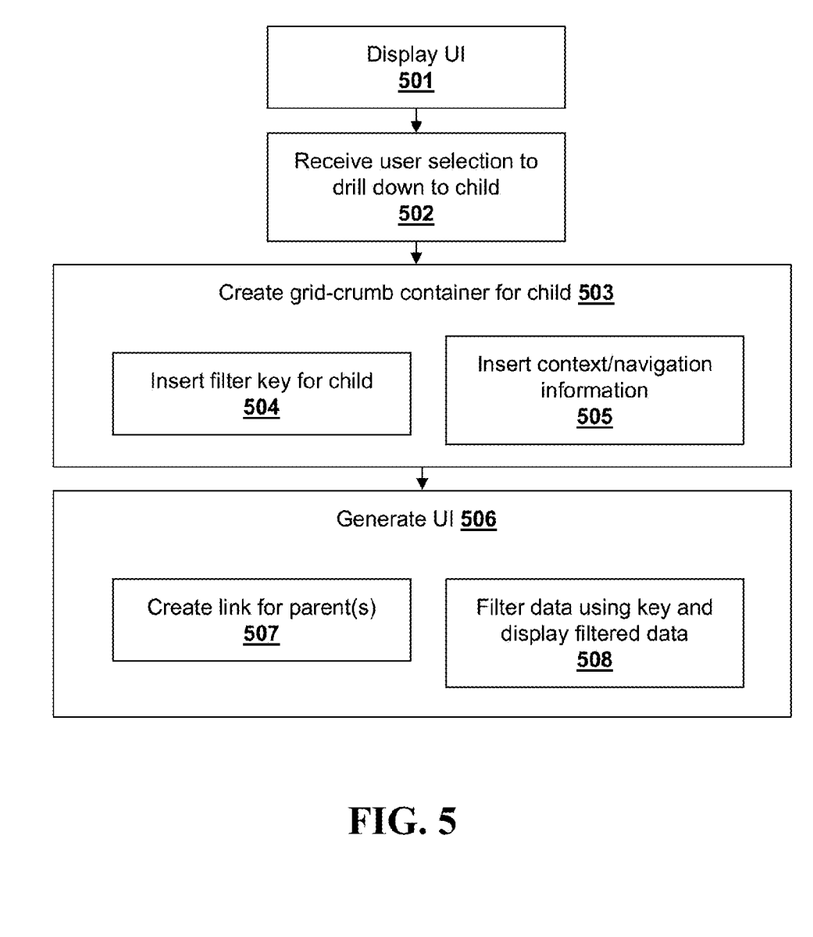
FIG. 5 shows a flowchart of an approach to drill down from a parent level to a child level of the hierarchical data.

FIG. 5 shows a flowchart of an approach to drill down from a parent level to a child level of the hierarchical data. At 501, the user interface displays hierarchical data for a given level of the hierarchical data. The user may be currently at the highest level of the hierarchical data, in which case the UI will display all of the unfiltered data. In contrast, if the user is at a lower hierarchical level, then the UI may be displaying a filtered set of data appropriate for that hierarchical level.

Figure 6A:
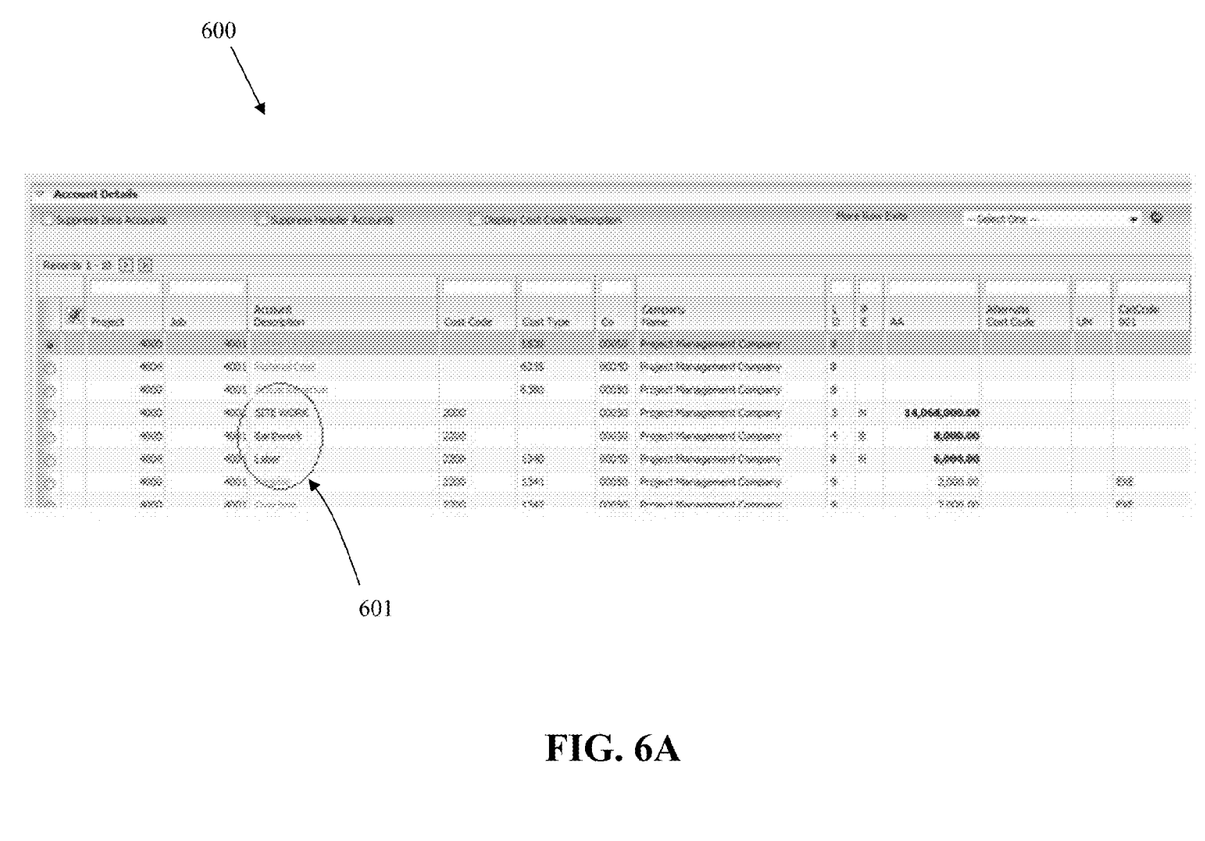
FIGS. 6A-C illustrate example screenshots of an application implementing hierarchical data display and navigation in accordance with certain embodiments of the invention.

To illustrate, consider FIG. 6A which shows unfiltered hierarchical data displayed in a grid. Here, the user interface 600 displays the entirety of the hierarchical data since the user is currently at the top hierarchical level for the data. The UI 600 includes a visual, clickable indicator 601 over data records in the grid that have lower level children. For example, in FIG. 6A, data records for "Site Work," "Earthwork," and "Labor" are shown (e.g., in a different display color such as blue similar in appearance to a hyperlink on a web page), indicating that these data records have lower level children and can be clicked. When the hyperlink is selected by the user, the interface navigates to the hierarchical level associated with that link.

At 502, the user may indicate selection of one of the links on the UI 600 to drill down to a lower hierarchical level of the hierarchy. In the example interface of FIG. 6A, this involves selection by the user of any of the Site Work," "Earthwork," or "Labor" links to indicate a desire to drill down to the selected level. When the link for one of these descendent levels is selected by the user, the interface navigates to the appropriate hierarchical level associated with that selected link.

As part of this process to navigate to a lower level, at 503, a new grid-crumb structure is created for the selected hierarchical level. The grid-crumb structure is created by first initiating a new container for the grid-crumb. At 504, a set of filter key(s) are inserted into the container, which are used to filter the overall set of hierarchical data such that only the data corresponding to the selected level of the hierarchy can be identified and then displayed. For a project-based set of hierarchical data as shown in FIG. 6A, the filter keys can be implemented as the combination of values from the cost code, cost type, and/or LD (level of detail) columns. At 505, navigation link information is inserted into the container, which includes hierarchical context information to permit navigation to higher ancestor levels of the hierarchy.

At 506, the user interface is generated for display to the user for the selected descendent hierarchical level. At 508, the filter keys are used to filter the set of hierarchical data to identify the exact set of data that should be displayed for a selected hierarchical level of the data. At 507, the navigation link information is used to generate a hyperlink within the user interface to maintain a link or a set of links to the parent levels of the hierarchy, which can then be selected by the user to return to those levels.

Figure 6B:
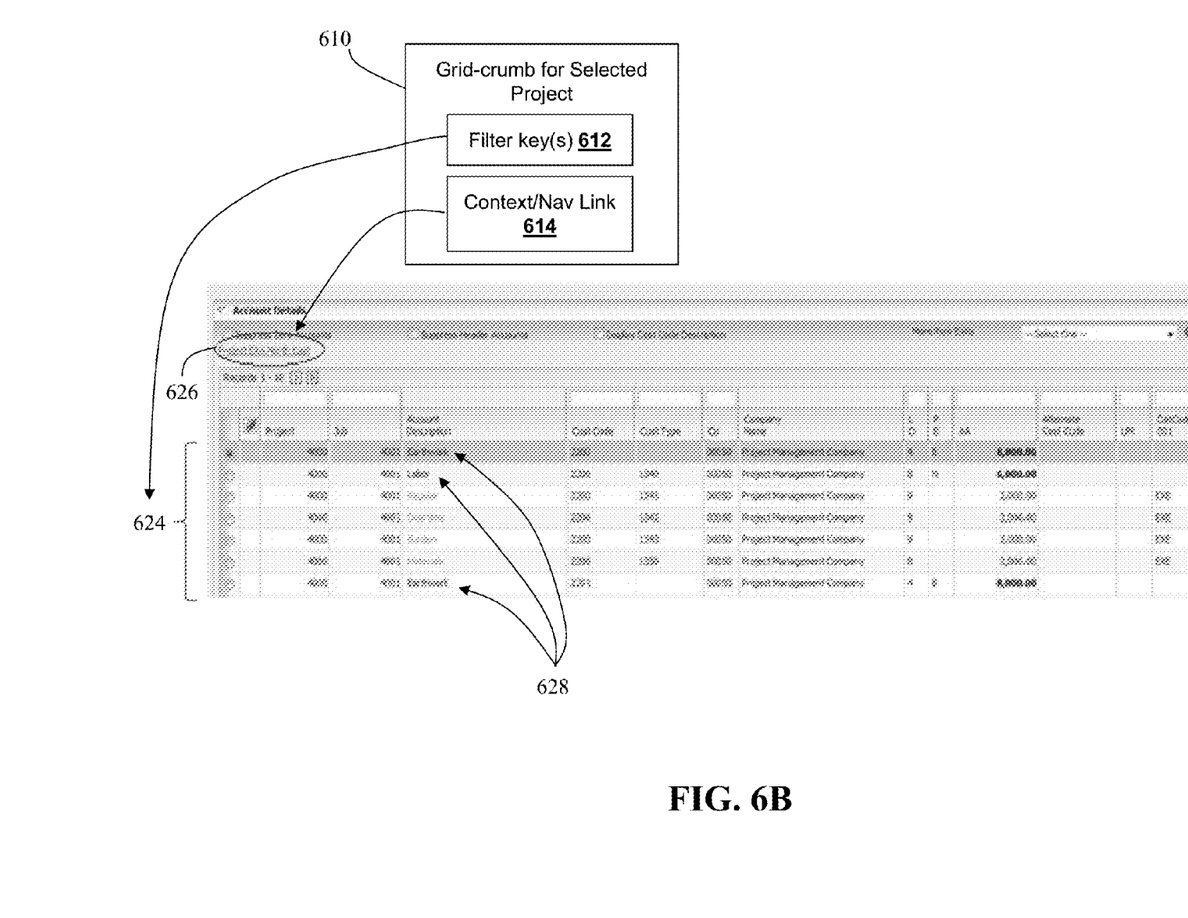

FIG. 6B illustrates the newly generated UI that resulted from the user drilling down from the interface of FIG. 6A (e.g., where the user clicked on one of the data records having lower level children in FIG. 6A). For example, in FIG. 6A, the user may have selected the "Project EXA North East" data record. As a result, a grid-crumb container 610 has been created to drill down to this new hierarchical level. The grid-crumb container 610 includes filter keys 612 that are used to filter the hierarchical data such that only the data corresponding to the selected level of the hierarchy (e.g., "Project EXA North East") is identified and then displayed as filtered data 624. As previously noted, the filter keys 612 can be implemented as the combination of values from the cost code, cost type, and LD (level of detail) columns that pertain to the selected "Project EXA North East" data record. The data in the grid has been filtered, so that only child records of "Project EXA North East" are shown. In the illustrated embodiment, the filter only filtered by parent record, so that all child records of "Project EXA North East" are displayed, regardless of LD.

In addition, the grid-crumb container 610 includes navigation link information 614 having hierarchical context information to permit navigation to higher ancestor levels of the hierarchy. This information is used to create a clickable link in the user interface that permits navigation to ancestor levels of the hierarchy. In the current interface, the upper left corner of the interface includes a clickable link 626, which the user may select to return to the higher level of the hierarchy.

The user may continue to navigate further through the hierarchy by selecting data records with lower level child records. Each of the data items which are eligible to be drilled down are highlighted and displayed as hyperlinks 628. Selection by the user of the drill-down hyperlink 628 will repeat the above process to navigate to the descendent hierarchical level, and to then display the hierarchical data appropriate for that selected level.

Figure 6C:
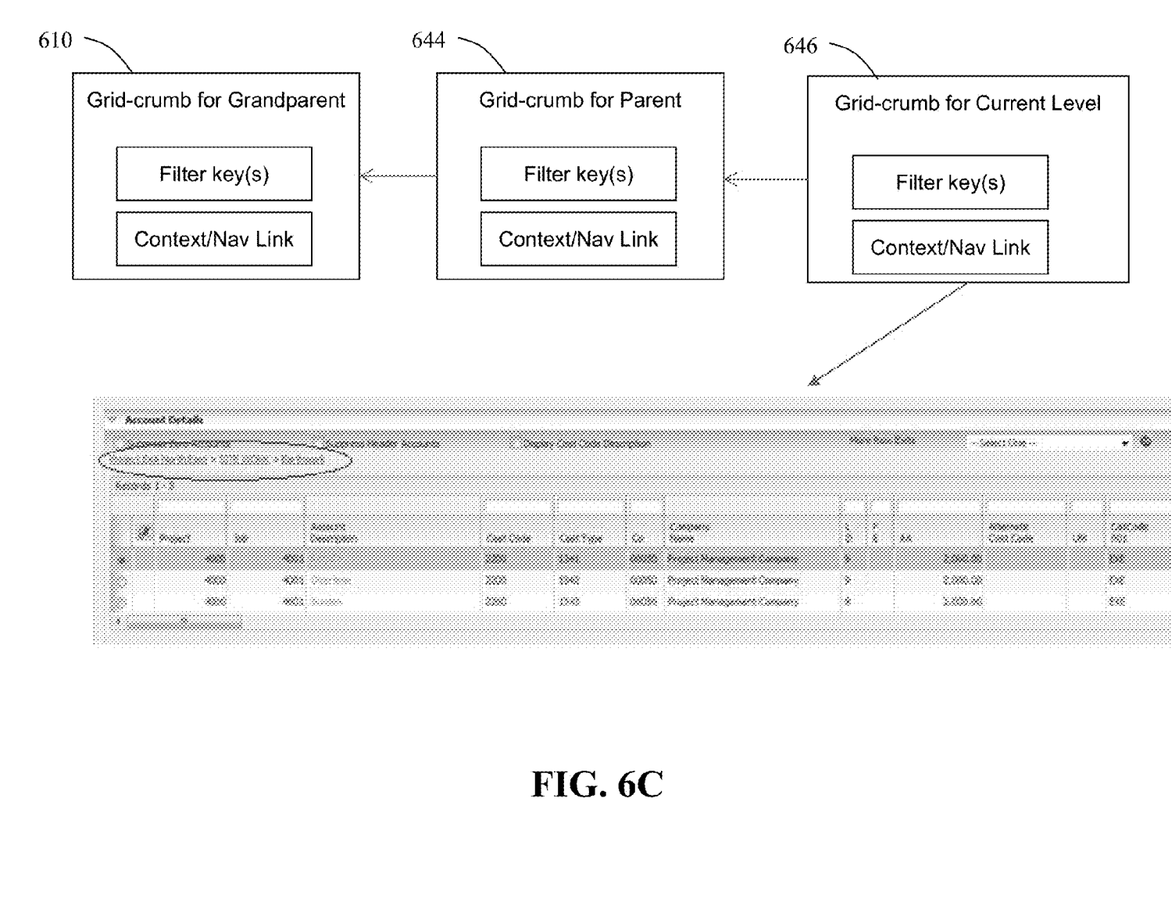

FIG. 6C illustrates the result of navigating further through the levels of the hierarchy in the example set of data. Here, the user has selected the "SITE WORK" and "Earthwork" levels of the hierarchy, so that only child records of the "Earthwork" data records are displayed in the grid. A sequence of grid-crumbs exists based upon the navigation through the multiple hierarchical levels to the current level. In particular, the grid-crumb container 646 has been created for the current hierarchical level. This grid-crumb container 646 includes the appropriate filter keys for display of the hierarchical data in the current interface display. The grid-crumb container 646 also includes the appropriate navigation link information to navigate to its parent hierarchical level. The sequence of grid-crumb structures includes the grid-crumb structure 644 and 610 for the parent and grandparent hierarchical levels, respectively. Both "SITE WORK" and "Earthwork" have been added to the hierarchical context (e.g., as clickable links). The user may return to those levels of the hierarchy by selecting those elements of the hierarchical context.

Figure 7:
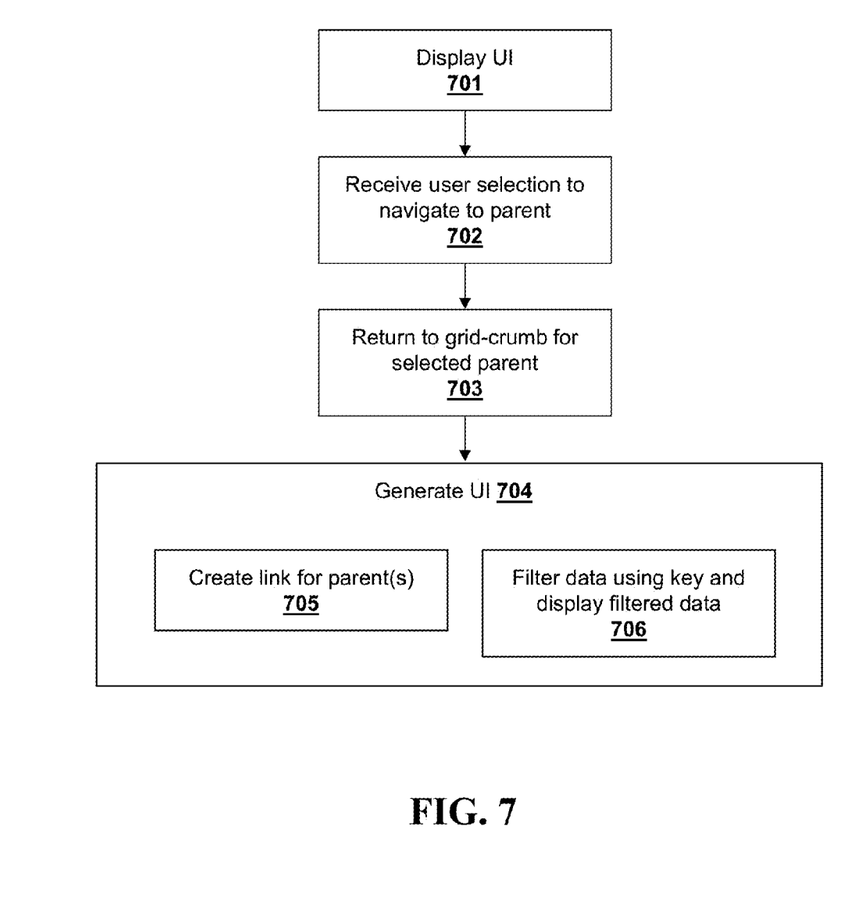
FIG. 7 illustrates a process for navigating upwards from a descendant hierarchical level to an ancestor hierarchical level.

FIG. 7 illustrates a process for navigating upwards from a descendent hierarchical level to an ancestor hierarchical level. At 701, the user interface displays hierarchical data for a given level of the hierarchical data. The user may be at a lower hierarchical level, where the UI displays a filtered set of data appropriate for that hierarchical level. For example as discussed above, FIG. 6C illustrates a UI at a lower hierarchical level of data, where e.g., where the user has selected the "SITE WORK" and "Earthwork" levels of the hierarchy, so that only child records of the "Earthwork" data record are displayed in the grid. A sequence of grid-crumbs exists based upon the navigation through the multiple hierarchical levels to the current level. In particular, the grid-crumb container 646 has been created for the current hierarchical level. This grid-crumb container 646 includes the appropriate filter keys for display of the hierarchical data in the current interface display. The grid-crumb container 646 also includes the appropriate navigation link information to navigate to its parent hierarchical level. The sequence of grid-crumb structures includes the grid-crumb structure 644 and 610 for the parent hierarchical levels. Both "SITE WORK" and "Earthwork" have been added to the hierarchical context. The user may return to those levels of the hierarchy by selecting those elements of the hierarchical context.

The grid-crumb container 646 includes navigation link information having hierarchical context information to permit navigation to higher ancestor levels of the hierarchy. This information is used to create a clickable link in the user interface that permits navigation to ancestor levels of the hierarchy. In the current interface, the upper left corner of the interface includes a clickable link, which the user may select to return to the higher level of the hierarchy.

At 702, the user may indicate selection of one of the links on the UI to navigate to a higher (ancestor) level of the hierarchy. In the example interface of FIG. 6C, this involves selection by the user of the clickable link at the upper left corner of the interface. This causes the grid-crumb for the current level to be destroyed in some embodiments. This also causes, at 703, a return to the grid-crumb (if it exists) for the selected parent hierarchical level.

At 704, the user interface is generated for display to the user for the selected ancestor hierarchical level. At 706, the filter keys are used to filter the set of hierarchical data to identify the exact set of data that should be displayed for a selected ancestor hierarchical level of the data. At 705, the navigation link information is used to generate a hyperlink within the user interface to maintain a link or a set of links to the parent levels of the hierarchy, which can then be selected by the user to return to those levels.

For example, the user may have selected to return back to the parent level indicated by the hyperlink for the "Project EXA North East" data record. As a result, a return is made to the grid-crumb container 610 that had previously been created for this higher hierarchical level. This allows the user interface to once again display the data shown in FIG. 6B, where grid-crumb container 610 having the filter keys 612 is used to filter the hierarchical data such that only the data corresponding to the selected level of the hierarchy (e.g., "Project EXA North East") is identified and then displayed as filtered data 624. In addition, the grid-crumb container 610 includes navigation link information 614 having hierarchical context information to permit navigation to higher ancestor levels of the hierarchy. Therefore, this information is used to create a clickable link 626 in the user interface that permits navigation to ancestor levels of the hierarchy.

Therefore, what has been described is an improved approach for viewing and navigating through hierarchical data while maintaining relationships between levels of the hierarchy.

As previously noted, conventional technologies fail to provide adequate solutions to these problems. For example, a typical project management application may need to handle a very large set of complex accounting data, where the accounting data includes an extremely high volume of data for multiple accounts having multiple levels of nested hierarchical data. Traditional project management applications have limited abilities to handle this type of data, since the extremely large volume for the data makes it very difficult to adequately allow a user to detect and to drill down to the data of specific interest, and to also maintain enough context to navigate between the different hierarchical levels.

The invention is particularly applicable to more efficiently allow for navigation and display for large sets of data that inherently include a hierarchy within the data. At each level of the accounting hierarchy, there are keys that represent the data that should be displayed for that hierarchical level, e.g., cost codes and account codes. The grid-crumb structures of the invention provide a container to hold the appropriate keys for a given hierarchical data so that effective filtering can be performed to allow for only the data for that level to be displayed. What this means is that at the start at the highest level of the hierarchy, the highest level of detail can be displayed to the user. However, as the user drills down deeper in the lower levels of the hierarchy, it is built into the grid crumb structure to only display the lower levels of detail appropriate for that lower level. The trail of grid-crumbs is built as the user descends deeper and deeper into an account hierarchy. The grid-crumb structure permits a set of representations, where the highest level corresponds to level of detail appropriate for the highest level of the hierarchy, whereas the lower levels representations are appropriate for the lower levels of the hierarchy.

The context maintained by the grid-crumb structure also permits effective navigation between the different levels of the hierarchy. A navigation link structure is maintained by the grid-crumb to identify the parent hierarchical levels from which the current level was reached. The navigation link is displayed as a hyperlink that permits navigation back to a higher level of the hierarchy, at which point the hierarchical data for that parent level is displayed. In addition, child levels that can be reached are also displayed as hyperlinks to permit further drilling down into lower hierarchical levels.

Therefore, what has been described is an improved approach that permits navigation between hierarchical levels as well as filtering to identify the data that should be displayed for a current hierarchical data. A context is maintained to track the current location of the interface, particularly as it pertains to other hierarchical levels.

System Architecture Overview

Figure 8:
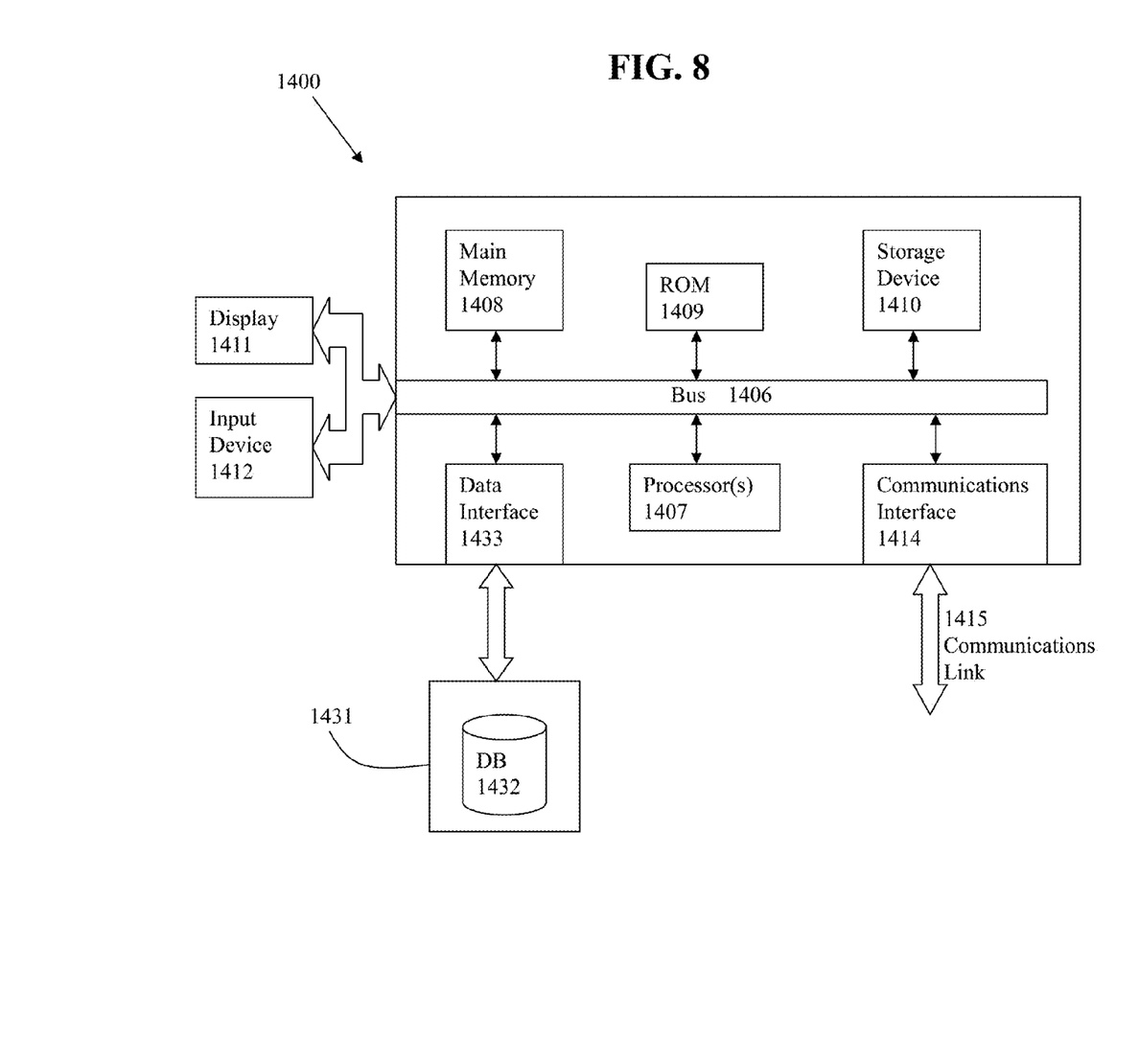
FIG. 8 illustrates a computerized system on which an embodiment of the invention can be implemented.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), data interface 1433, and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Database 1432, maintained in a storage device 1431, is coupled to computer system 1400 via data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method implemented with a processor for displaying hierarchical data, comprising:
    displaying hierarchical data to a user using a grid, wherein the hierarchical data displayed in a user interface comprises:
        one or more data records having a selectable interface component within the one or more data records to navigate to display a portion of the hierarchical data when the one or more data records have one or more child records, wherein the one or more data records does not have the selectable interface component within the one or more data records when the one or more data records does not have one or more child records, and
        a level of detail value corresponding to each of the one or more data records representing a hierarchical relationship between the one or more data records and the hierarchical data;
    receiving a user selection of the selectable interface component to navigate to the portion of the hierarchical data that is of interest;
    creating a gridcrumb structure to maintain a filter and a hierarchical context based at least in part on the user selection of the selectable interface component, wherein the filter is based at least in part on the user selection of the selectable interface component and the hierarchical context tracks navigation through the hierarchical data;
    applying the filter to generate filtered hierarchical data, wherein the hierarchical data is filtered to identify the portion of the hierarchical data that is of interest; and
    navigating to a new set of interface content that displays the filtered hierarchical data and the hierarchical context to the user, wherein the filtered hierarchical data displayed in a new grid in the new set of interface content comprises:
        one or more filtered data records having the selectable interface component within the one or more data records when the respective data record have one or more child records, and
        a level of detail value corresponding to each of the one or more filtered data records displayed.

2. The method of claim 1, wherein the selectable interface component is a hyperlink.

3. The method of claim 1, wherein the user selection comprises selecting a data record having lower level child records in the hierarchy.

4. The method of claim 3, wherein the hierarchical context comprises elements representing levels of the hierarchy that has been navigated.

5. The method of claim 4, wherein updating the hierarchical context comprises adding information associated with the selected data record as an element of the hierarchical context.

6. The method of claim 4, wherein a displayed element of the hierarchical context is selectable to allow the user to navigate back to the hierarchy level of the data record corresponding to the element.

7. The method of claim 3, wherein the filtered hierarchical data comprises child data records of the selected data record.

8. The method of claim 3, wherein the filter is based at least in part on the selected data record and a hierarchy level corresponding to a level lower than that of the selected data record.

9. The method of claim 1, further comprising creating a new gridcrumb structure each time the user selects on the selectable interface component in which a gridcrumb structure maintains the filter and the hierarchical context, wherein a sequence of a plurality of the gridcrumb structures is used to track navigation through a plurality of different hierarchical levels of the hierarchical data.

10. The method of claim 1, wherein the filter comprises one or more filter keys.

11. A system for displaying hierarchical data comprising:
    a processor; and
    a memory to hold a set of program code instructions, in which the set of program code instructions comprises program code to perform: displaying hierarchical data to a user using a grid, wherein the hierarchical data is displayed in a user interface comprises one or more data records having a selectable interface component to navigate to display a portion of the hierarchical data when the one or more data records have one or more child records, wherein the one or more data records does not have the selectable interface component within the one or more data records when the one or more data records does not have one or more child records, and a level of detail value corresponding to each of the one or more data records representing a hierarchical relationship between the one or more data records and the hierarchical data; receiving a user selection of the selectable interface component to navigate to the portion of the hierarchical data that is of interest; creating a gridcrumb structure to maintain a filter and a hierarchical context based at least in part on the user selection of the selectable interface component, wherein the filter is based at least in part on the user selection of the selectable interface component and the hierarchical context tracks navigation through the hierarchical data; the filter to generate filtered hierarchical data, wherein the hierarchical data is filtered to identify the portion of the hierarchical data that is of interest; and navigating to a new set of interface content that displays the filtered hierarchical data and the hierarchical context to the user, wherein the filtered hierarchical data displayed in a new grid in the new set of interface content comprises: one or more filtered data records having the selectable interface component within the one or more data records when the respective data record have one or more child records, and a level of detail value corresponding to each of the one or more filtered data records displayed.

12. The system of claim 11, wherein the selectable interface component is a hyperlink.

13. The system of claim 11, wherein the user selection comprises selecting a data record having lower level child records in the hierarchy.

14. The system of claim 13, wherein the hierarchical context comprises elements representing levels of the hierarchy that the user has navigated through.

15. The system of claim 14, wherein updating the hierarchical context comprises adding information associated with the selected data record as an element of the hierarchical context.

16. The system of claim 14, wherein a displayed element of the hierarchical context is selectable to allow the user to navigate back to the hierarchy level of the data record corresponding to the element.

17. The system of claim 11, wherein the filtered hierarchical data comprises child data records of the selected data record.

18. The system of claim 13, wherein the filter is based on the selected data record and a hierarchy level corresponding to a level lower than that of the selected data record.

19. The system of claim 11, in which the program code further performs creating a new gridcrumb structure each time the user selects on the selectable interface component, wherein a sequence of a plurality of the gridcrumb structures is used to track navigation through a plurality of different hierarchical levels of the hierarchical data.

20. The system of claim 11, wherein the filter comprises one or more filter keys.

21. A computer program product including a non-transitory computer readable medium having instructions which, when executed by a processor, causes the processor to perform a process for displaying hierarchical data, the process comprising:

displaying hierarchical data to a user using a grid, wherein the hierarchical data displayed in a user interface comprises:

one or more data records having a selectable interface component within the one or more data records to navigate to display a portion of the hierarchical data when the one or more data records have one or more child records, wherein the one or more data records does not have the selectable interface component within the one or more data records when the one or more data records does not have one or more child records, and a level of detail value corresponding to each of the one or more data records representing a hierarchical relationship between the one or more data records and the hierarchical data;

receiving a user selection of the selectable interface component to navigate to the portion of the hierarchical data that is of interest;

creating a gridcrumb structure to maintain a filter and a hierarchical context based at least in part on the user selection of the selectable interface component, wherein the filter is based at least in part on the user selection of the selectable interface component and the hierarchical context tracks navigation through the hierarchical data;

applying the filter to generate filtered hierarchical data, wherein the hierarchical data is filtered to identify the portion of the hierarchical data that is of interest; and navigating to a new set of interface content that displays the filtered hierarchical data and the hierarchical context to the user, wherein the filtered hierarchical data displayed in a new grid in the new set of interface content comprises:

one or more filtered data records having the selectable interface component within the one or more data records when the respective data record have one or more child records, and a level of detail value corresponding to each of the one or more filtered data records displayed.

22. The computer program product of claim 21, wherein the selectable interface component is a hyperlink.

23. The computer program product of claim 21, wherein the user selection comprises selecting a data record having lower level child records in the hierarchy.

24. The computer program product of claim 23, wherein the hierarchical context comprises elements representing levels of the hierarchy that the user has navigated through.

25. The computer program product of claim 24, wherein updating the hierarchical context comprises adding information associated with the selected data record as an element of the hierarchical context.

26. The computer program product of claim 24, wherein a displayed element of the hierarchical context is selectable to allow the user to navigate back to the hierarchy level of the data record corresponding to the element.

27. The computer program product of claim 21, wherein the filtered hierarchical data comprises child data records of the selected data record.

28. The computer program product of claim 23, wherein the filter is based on the selected data record and a hierarchy level corresponding to a level lower than that of the selected data record.

29. The computer program product of claim 21, the process further comprising creating a new gridcrumb structure each time the user selects on the selectable interface component, wherein a sequence of a plurality of the gridcrumb structures is used to track navigation through a plurality of different hierarchical levels of the hierarchical data.

30. The computer program product of claim 21, wherein the filter comprises one or more filter keys.

* * * * *

UNITED STATES PATENT AND TRADEMARK OFFICE
CERTIFICATE OF CORRECTION

PATENT NO. : 9,542,478 B2  
APPLICATION NO. : 14/247790  
DATED : January 10, 2017  
INVENTOR(S) : Eide et al.

Page 1 of 1

It is certified that error appears in the above-identified patent and that said Letters Patent is hereby corrected as shown below:

In the Specification

In Column 8, Line 25, delete "grid crumb" and insert -- gridcrumb --, therefor.

In Column 9, Line 29, delete "PTSN," and insert -- PSTN, --, therefor.

In the Claims

In Column 10, Line 45, in Claim 7, delete "claim 3," and insert -- claim 1, --, therefor.

In Column 10, Lines 53-54, in Claim 9, delete "component in which a gridcrumb structure maintains the filter and the hierarchical context," and insert -- component, --, therefor.

In Column 10, Line 60, in Claim 11, after "data" insert -- , --.

Signed and Sealed this  
First Day of August, 2017

Joseph Matal  
*Performing the Functions and Duties of the*  
*Under Secretary of Commerce for Intellectual Property and*  
*Director of the United States Patent and Trademark Office*